UNITED STATES PATENT OFFICE.

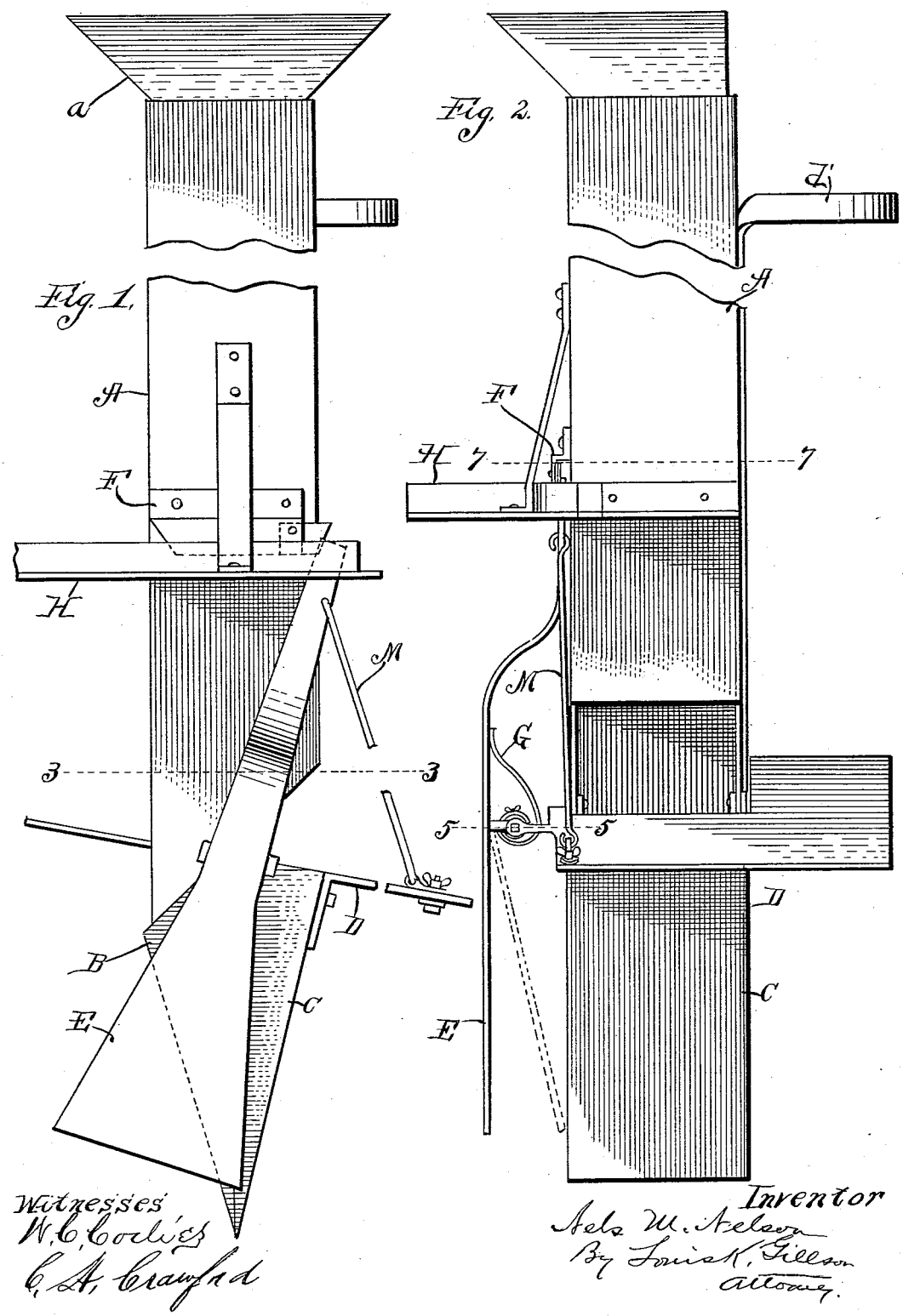

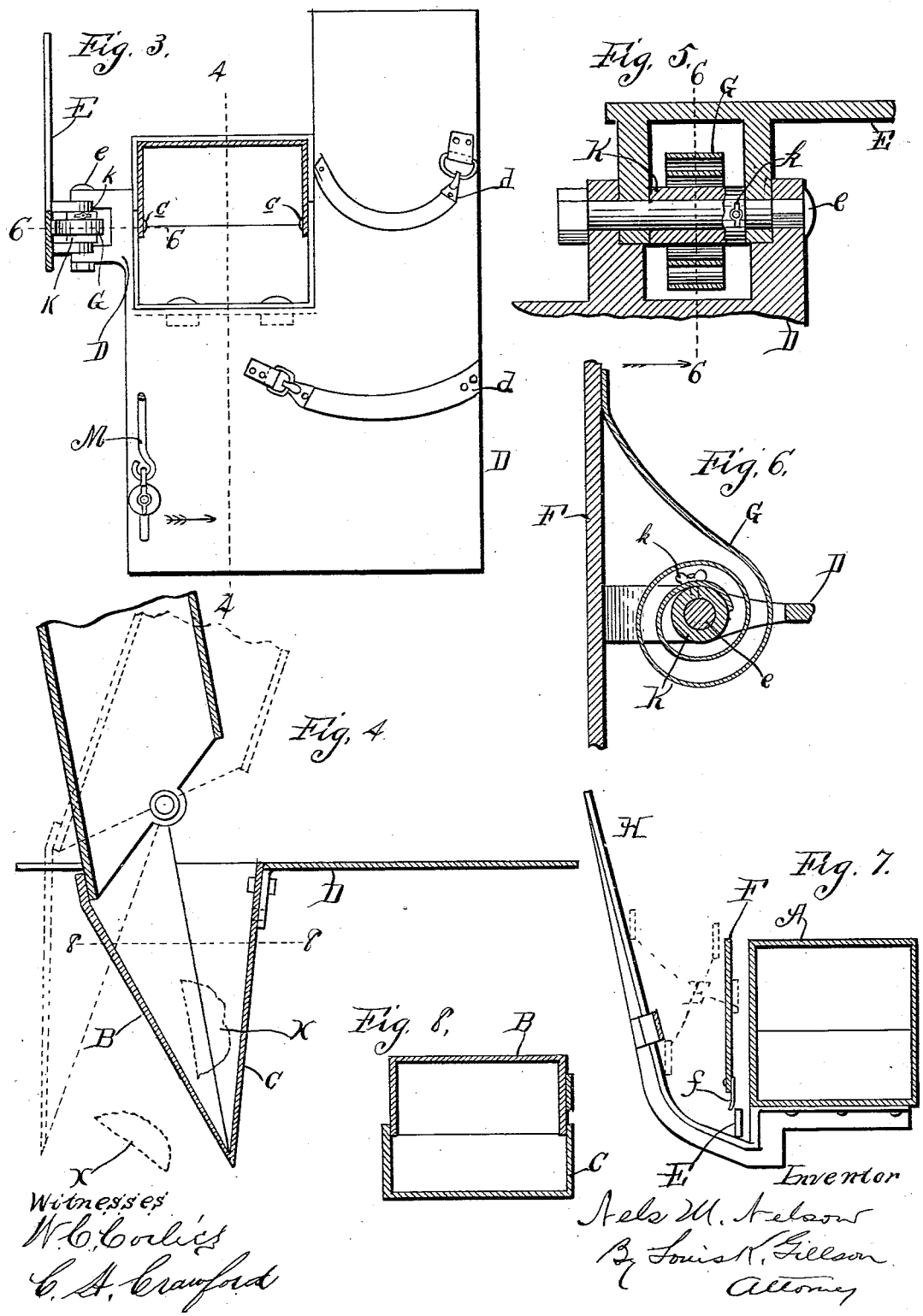

NELS M. NELSON, OF CHICAGO, ILLINOIS.

POTATO-PLANTER.

SPECIFICATION forming part of Letters Patent No. 557,865, dated April 7, 1896.

Application filed January 23, 1896. Serial No. 576,611. (No model.)

*To all whom it may concern:*

Be it known that I, NELS M. NELSON, a subject of the King of Sweden and Norway, residing at Chicago, in the county of Cook and State of Illinois, have invented certain new and useful Improvements in Potato-Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to that class of potato-planters which are adapted to be secured to the leg and foot of the operator and to form a hole in the soil as he steps and to permit him to drop the seed into that hole through a tube.

The object of the invention is to simplify the construction of devices of this kind, and more particularly to provide a simple, automatic, and thoroughly efficient covering device by which the seed-potato is effectually covered as the implement is withdrawn from the soil by the act of the operator in stepping forward.

The invention consists of a tube adapted to be attached to the leg of the user and which terminates at the bottom in a pair of jaws, presenting, when closed, a sharp transverse edge, which readily enters the soil, one of the jaws being movable and carrying a foot piece or pedal which rests firmly upon the surface of the ground as the operator bears his weight upon it, so that the jaw to which it is attached is held securely, and the other jaw, which is rigidly attached to the tube, is forced backwardly to form the hole for the reception of the seed, and at the same time allowing the latter to escape from the tube.

It consists, further, in the combination, with such a device, of a covering-arm pivoted to the pedal-piece, so as to extend downwardly at the side of the jaws, and means for abruptly throwing the arm toward the jaws as they are withdrawn from the soil.

In the accompanying drawings, Figure 1 is a side elevation of the device. Fig. 2 is a front elevation of the same. Fig. 3 is a plan section on the line 3 3 of Fig. 1. Fig. 4 is a detail section showing the movement of the jaws. Fig. 5 is a detail plan section on the line 5 5 of Fig. 2. Fig. 6 is a detail section on the line 6 6 of Fig. 3. Fig. 7 is a plan section on the line 7 7 of Fig. 2, and Fig. 8 is a plan section on the line 8 8 of Fig. 4.

The tube forming the body of the device is preferably oblong-rectangular in form and is indicated by the character A and has at its upper end a flaring mouth or hopper $a$ for the more convenient delivery thereto of the seed-potato. This tube terminates at the bottom in a pair of jaws B C, the former at its rearward side and the latter at its forward side, which, when closed, taper to an edge transverse to the tube. The jaw B is rigidly attached to and may be integral with the tube A. The jaw C is pivotally attached to the tube, as indicated at $c$, the tube being cut away above the base of the jaw to allow the free movement of the latter.

A foot or pedal piece D is rigidly attached to the base of the jaw C, so as to extend across one side of the tube A. This pedal is provided with means, such as the straps $d\ d$, for secure attachment to the foot of the operator, and a strap $d'$, attached to the upper end of the tube A, is adapted to encircle the leg of the operator a little below the knee.

The angular relation of the pedal D and the jaw C is such that when the jaws are closed the pedal forms an angle of about ten degrees with a line perpendicular to the longitudinal direction of the tube A, so that when the operator steps forward and thrusts the edge of the jaws into the earth, his leg being of course somewhat inclined, the pedal will rest firmly and flatly upon the surface of the ground, the parts sustaining the relation indicated by the solid lines in Fig. 4. As the operator steps forward with the other foot the upper end of the tube is of course swung forwardly and the jaw B is forced backwardly, the pin $c$ serving as the pivot, and the jaws are thereby opened, as indicated by the dotted lines in Fig. 4, and the piece of potato X, which has previously been dropped into the tube, is deposited in the hole formed by the movement of the jaw B.

The pedal D is extended around to the opposite side of the tube, so that it has pivotal engagement therewith at both sides. To that portion of the pedal located on the side of the tube opposite from that at which the foot is applied there is pivoted the covering-arm E, as indicated at e, which extends downwardly along the side of the jaws B C and normally somewhat removed therefrom and adapted to swing toward these jaws. When the jaws are closed, the upper end of the arm E is caught behind a downwardly-projecting flange F, secured across the side of the tube A, so that the lower end of the arm E is held out or away from the jaws. The arm E is devoid of lateral movement with reference to the jaw C, and consequently as the tube is tilted forwardly as the operator steps the flange F is moved along past its upper end, and this flange is of such length that it releases the arm as the operator is about to step forward with the foot to which the device is attached. A spring G is wound around the pivot-pin e and bears against the upper end of the arm F in such manner as to force the latter outwardly away from the tube A, so that as soon as the arm is released from the flange F the action of the spring causes a quick movement of the arm upon its pivot-pin, thereby throwing a quantity of earth between the jaws B C and covering the seed-potato.

The outward movement of the upper end of the arm E is arrested by a cam-arm H, secured to the forward end of the tube A a little below the flange F and extending from the front of the tube backwardly and bearing away from its side wall. As the operator steps forward with the foot to which the planter is attached the depression of his toe causes the upper end of the arm E to slide along the cam-arm H, so as to bring it back into position for reëngagement with the forward end of the flange F as the toe is again relatively raised by the forward movement of the leg. In order to insure the certain reengagement of the arm E with the flange F, the latter is provided with a small leaf-spring f, projecting forwardly, so as to be engaged by the arm E during the latter part of its return movement. The arm is guided by this spring back of the flange F.

The form of the spring G may be indefinitely varied. I show a simple and preferred form and provide means for regulating its tension by securing it to the pivot-pin e by means of a sleeve K, mounted upon the latter, and to which the end of the spring is securely attached. The sleeve K is rotatable upon the pin e and is locked against rotation by means of a set-screw k, adapted to bear upon the pin e.

A link-brace M extends from the forward end of the pedal D to the upper end of the arm E, so as to reinforce the pivot-pin e and provide against lateral movement of the covering-arm.

While I have shown and described the covering-arm as being pivotally attached to a portion of the pedal, it is obvious that the attachment to this particular piece is only as a matter of convenience and simplicity in construction, the essential feature being that the attachment should be to the upper end or base of the jaw C or to a bracket secured thereto.

I am aware that I am not the first to construct a device of this kind in the form of a tube adapted to be attached to the leg of the operator and terminating at the bottom in jaws which are controlled by the action of the foot, and I am also aware that an effort has been made to provide for covering the seed after it has been deposited in the ground.

I claim as my invention—

1. In a potato-planter of the kind described the combination with a tube, a pair of jaws at the lower end of said tube and opening from side to side thereof, the rearward jaw being rigid with the tube and the forward jaw being pivoted thereto, of a pedal rigidly attached to the pivoted jaw, a covering-arm pivoted to the base of the pivoted jaw and projecting downwardly along the side thereof and having a movement to and from the jaw, means for holding the lower end of the arm away from the jaw when the jaws are closed, and means for throwing the lower end of the arm toward the jaws when the same are open; substantially as described and for the purpose set forth.

2. In a potato-planter of the kind described the combination with a tube, a pair of jaws at the lower end of said tube and opening from side to side thereof, the rearward jaw being rigid with the tube and the forward jaw being pivoted thereto, of a pedal rigidly attached to the pivoted jaw, a covering-arm pivoted to the base of the pivoted jaw and projecting downwardly along the side thereof and upwardly from its pivotal point and having a movement to and from the jaws, a downwardly-projecting guide-flange secured across the side of the tube above the end of the arm, its lower edge reaching below such end and being spaced apart from the tube, a spring for throwing the lower end of the arm toward the jaws, a cam-arm secured to the front of the tube and extending backwardly a greater distance than the guide-flange and being inclined away from the side of the tube and being located between the pivot of the arm and the upper end thereof; substantially as described and for the purpose set forth.

In testimony whereof I affix my signature in presence of two witnesses.

NELS M. NELSON.

Witnesses:
LOUIS K. GILLSON,
SPENCER WARD.